(12) United States Patent
Sun et al.

(10) Patent No.: US 10,674,580 B2
(45) Date of Patent: Jun. 2, 2020

(54) TERMINAL, LED LIGHT BULB CONTROLLING AND DISPLAYING SYSTEM AND METHOD THEREOF

(71) Applicant: SENGLED CO., LTD., Shanghai (CN)

(72) Inventors: Chaoqun Sun, Shanghai (CN); Lirong Zhang, Shanghai (CN); Jinxiang Shen, Shanghai (CN)

(73) Assignee: SENGLED CO., LTD., Shanghai (CN)

(*) Notice: Subject to any disclaimer, the term of this patent is extended or adjusted under 35 U.S.C. 154(b) by 0 days.

(21) Appl. No.: 16/469,837

(22) PCT Filed: Dec. 15, 2017

(86) PCT No.: PCT/CN2017/116669
§ 371 (c)(1),
(2) Date: Jun. 14, 2019

(87) PCT Pub. No.: WO2018/126875
PCT Pub. Date: Jul. 12, 2018

(65) Prior Publication Data
US 2020/0092968 A1  Mar. 19, 2020

(30) Foreign Application Priority Data
Jan. 3, 2017 (CN) .......................... 2017 1 0002288

(51) Int. Cl.
*H05B 33/00* (2006.01)
*H05B 45/20* (2020.01)
(Continued)

(52) U.S. Cl.
CPC .......... *H05B 45/20* (2020.01); *H04N 5/2354* (2013.01); *H04N 5/23209* (2013.01); *H05B 47/19* (2020.01)

(58) Field of Classification Search
None
See application file for complete search history.

(56) References Cited

FOREIGN PATENT DOCUMENTS

| CN | 103813586 A | 5/2014 |
|----|-------------|--------|
| CN | 203950106 U | 11/2014 |

(Continued)

OTHER PUBLICATIONS

The World Intellectual Property Organization (WIPO) International Search Report and Written Opinion for PCT/CN2017/116669 dated Mar. 14, 2018 8 Pages.

*Primary Examiner* — Monica C King
(74) *Attorney, Agent, or Firm* — Anova Law Group, PLLC

(57) ABSTRACT

A terminal, and a system and method for controlling and displaying an LED light bulb are provided. The terminal includes a first controller and a display module. The first controller is connected to the display module, a camera, and an LED light bulb, respectively. The first controller sends a control command to the LED light bulb to enable the LED light bulb to perform a light-bulb-adjusting operation corresponding to the control command, receive image data of the light-bulb-adjusting operation sent by the camera, and transmit the image data of the light-bulb-adjusting operation to the display module. The display module displays the image data of the light-bulb-adjusting operation and the light-adjusting information carried by the control command to a user. Thus, the terminal acquires the image data of the light-bulb-adjusting operation of the LED light bulb in real-time.

20 Claims, 4 Drawing Sheets

(51) Int. Cl.
*H04N 5/235* (2006.01)
*H04N 5/232* (2006.01)
*H05B 47/19* (2020.01)

(56) References Cited

FOREIGN PATENT DOCUMENTS

| | | |
|---|---|---|
| CN | 204206579 U | 3/2015 |
| CN | 104977904 A | 10/2015 |
| CN | 106713760 A | 5/2017 |
| CN | 206490858 U | 9/2017 |
| KR | 20140088665 A | 7/2014 |

TERMINAL, LED LIGHT BULB CONTROLLING AND DISPLAYING SYSTEM AND METHOD THEREOF

CROSS-REFERENCES TO RELATED APPLICATIONS

This application is a national phase entry under 35 U.S.C. § 371 of PCT Patent Application No. PCT/CN2017/116669, filed on Dec. 15, 2017, which claims the priority to Chinese Patent Application No. 201710002288.X filed on Jan. 3, 2017, the entire contents of both of which are incorporated herein by reference.

FIELD OF THE DISCLOSURE

The present disclosure generally relates to the technical field of LED light bulb, and more particularly, relates to a terminal, and an LED light bulb controlling and displaying system and method thereof.

BACKGROUND

Because of various advantages such as being energy-efficient, environmentally friendly, optically controllable and solid state, as well as having a long operating life, the light emitting diodes (hereinafter referred to as "LED") have been widely applied to various fields including the public lighting in cities, and the indoor lighting in offices and at home, etc.

In existing technologies, a terminal is often used to intelligently control the LED light bulb. Options such as button, bar, or arc may be configured on the user operation interface of the terminal, and the user may operate on the user operation interface of the terminal to further control the light of the LED light bulb remotely.

However, in the existing technologies, when the user uses the user operation interface of the terminal to remotely control the light of the LED light bulb, the user can hardly know whether a remote operation of the LED light bulb is actually executed.

BRIEF SUMMARY OF THE DISCLOSURE

The present disclosure provides a terminal, and an LED light bulb controlling and displaying system and method thereof, thereby solving the issue that the user can hardly know whether the remote operation of the LED light bulb is actually executed when the user uses the user operation interface of the terminal to remotely control the light of the LED light bulb.

One aspect of the present disclosure provides a terminal, comprising: a first controller and a display module. The first controller is connected to the display module, and the first controller is connected to a camera and an LED light bulb, respectively.

The first controller is configured to acquire an LED light bulb controlling command and send the LED light bulb controlling command to the LED light bulb, thereby enabling the LED light bulb to perform a light-bulb-adjusting operation corresponding to the LED light bulb controlling command. Further, the first controller receives image data of the light-bulb-adjusting operation sent by the camera and transmits the image data of the light-bulb-adjusting operation to the display module. The image data of the light-bulb-adjusting operation is collected by the camera during the process where the LED light bulb performs the light-bulb-adjusting operation corresponding to the LED light bulb controlling command.

The display module is configured to display the image data of the light-bulb-adjusting operation and the light-adjusting information carried by the LED light bulb controlling command to a user.

Another aspect of the present disclosure provides a system for controlling and displaying an LED light bulb, including: an LED light bulb and a camera. The LED light bulb is located within the monitoring range of the camera.

The LED light bulb is configured to receive an LED light bulb controlling command sent by a terminal and perform a light-bulb-adjusting operation corresponding to the LED light bulb controlling command.

The camera is configured to collect image data of the light-bulb-adjusting operation during the process where the LED light bulb performs the light-bulb-adjusting operation corresponding to the LED light bulb controlling command, and send the image data of the light-bulb-adjusting operation to the terminal. Thus, the terminal may be able to display the image data of the light-bulb-adjusting operation and the light-adjusting information carried by the LED light bulb controlling command to the user simultaneously.

Another aspect of the present disclosure provides a method for controlling and displaying an LED light bulb, including: acquiring, by a terminal, an LED light bulb controlling command, and sending, by the terminal, the LED light bulb controlling command to an LED light bulb, thereby enabling the LED light bulb to perform a light-bulb-adjusting operation corresponding to the LED light bulb controlling command; receiving, by the terminal, image data of the light-bulb-adjusting operation sent by the camera, where the image data of the light-bulb-adjusting operation is collected by the camera during the process where the LED light bulb performs the light-bulb-adjusting operation corresponding to the LED light bulb controlling command; and displaying, by the terminal, the image data of the light-bulb-adjusting operation and the light-adjusting information carried by the LED light bulb controlling command to a user.

Technical effects of the present disclosure lie in that: a terminal including a first controller and a display module is provided, where the first controller is connected to the display module and the first controller is connected to a camera and an LED light bulb, respectively. The first controller acquires an LED light bulb controlling command and sends the LED light bulb controlling command to the LED light bulb, thus enabling the LED light bulb to perform a light-bulb-adjusting operation corresponding to the LED light bulb controlling command; the first controller further receives image data of a light-bulb-adjusting operation sent by the camera and transmit the image data of the light-bulb-adjusting operation to the display module, where the image data of the light-bulb-adjusting operation is collected by the camera during a process where the LED light bulb performs the light-bulb-adjusting operation corresponding to the LED light bulb controlling command.

Further, the display module displays the image data of the light-bulb-adjusting operation and the light-adjusting information carried by the LED light bulb controlling command to the user. Accordingly, when the terminal adjusts the light of the LED light bulb remotely, because the camera is configured in the space where the LED light bulb is, the camera may collect the image data of the light-bulb-adjusting operation performed by the LED light bulb corresponding to the LED light bulb controlling command in real-time. Further, the camera may send the image data of the light-bulb-adjusting operation to the terminal, such that the terminal may acquire the image data of the light-bulb-adjusting operation of the LED light bulb in real-time. Further, the image data of the light-bulb-adjusting operation of the LED light bulb may be displayed by the terminal to the user, thereby enabling the user to determine whether a remote operation of the LED light bulb is actually executed.

BRIEF DESCRIPTION OF THE DRAWINGS

To more clearly illustrate the technical solutions in embodiments of the present disclosure or the prior art, the accompanying drawings of the present disclosure or the prior art are briefly introduced hereinafter. Obviously, the accompanying drawings merely provide certain exemplary implementations, based on which, other drawings or implementations may be obtainable by those ordinarily skilled in the art without creative effort.

Figure 1:
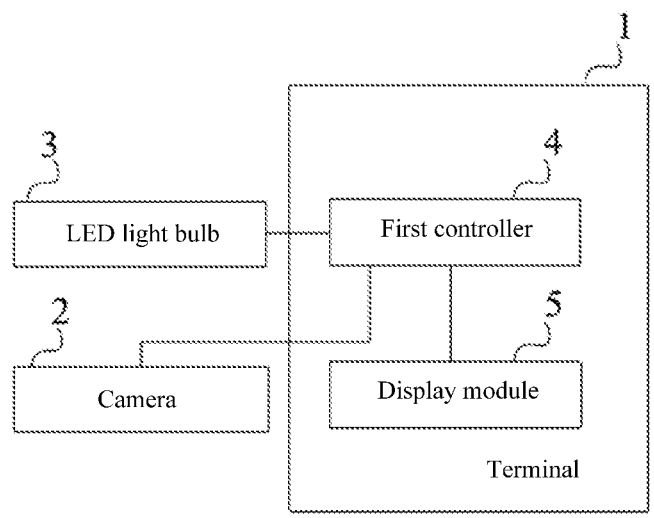
FIG. 1 is a structural schematic view of a terminal consistent with embodiments of the present disclosure.

In the accompanying drawings, reference numerals are as follows:

| | | |
|---|---|---|
| 1 - Terminal | 2 - Camera | 3 - LED light bulb |
| 4 - First controller | 5 - Display module | 6 - First communication interface |
| 7 - User interface | 8 - Operation controller | 9 - Memory |
| 10 - Display screen module | 11 - PCB | 12 - Inductor |
| 13 - Microphone | 14 - Second controller | 15 - Image data collector |
| 16 - Second communication interface | 17 - Sensor | |

DETAILED DESCRIPTION

To make the objectives, technical solutions, and advantages of the present disclosure clearer, with reference to the accompanying drawings of the present disclosure, technical solutions of the present disclosure are described more fully hereinafter. Obviously, the disclosed embodiments only provide some exemplary implementations. Based on the disclosed embodiments, other embodiments obtainable by those ordinarily skilled in the relevant art without creative labor shall all fall within the protection scope of the present disclosure.

FIG. 1 is a structural schematic view of a terminal consistent with embodiments of the present disclosure. As shown in FIG. 1, the terminal 1 may include a first controller 4 and a display module 5. The first controller 4 may be connected to the display module 5. Further, the first controller 4 may be connected to a camera 2 and an LED light bulb 3, respectively.

The first controller 4 is configured to acquire an LED light bulb controlling command and send the LED light bulb controlling command to the LED light bulb 3, thereby enabling the LED light bulb 3 to perform a light-bulb-adjusting operation corresponding to the LED light bulb controlling command. Further, the first controller 4 receives image data of the light-bulb-adjusting operation sent by the camera 2 and transmits the image data of the light-bulb-adjusting operation to the display module 5. The image data of the light-bulb-adjusting operation is collected by the camera 2 during the process where the LED light bulb 3 performs the light-bulb-adjusting operation corresponding to the LED light bulb controlling command.

The display module 5 is configured to display the image data of the light-bulb-adjusting operation to a user, and also display light-adjusting information carried by the LED light bulb controlling command to the user.

As such, the present disclosure provides the terminal 1 including the first controller 4 and the display module 5, where the first controller is connected to the display module 5. Further, the first controller 4 may be connected to the camera 2 and the LED light bulb 3 via a wired connection. Or, the first controller 4 may be connected to the camera 2 and the LED light bulb 3 via a wireless connection. The wireless connection may be implemented to be a wireless-fidelity (Wi-Fi) connection or a Bluetooth connection, etc.

Further, the camera 2 may be placed in the space where the LED light bulb 3 is. For example, the LED light bulb 3 may be located within a monitoring range of the camera 2. The specific number of the LED light bulbs 3 and the locations of such LED light bulbs 3, as well as the number and locations of the cameras 2 may be configured based on actual demands and are not specifically limited. Further, the LED light bulb 3 and the camera 2 may be integrated into one device, and the LED light bulb 3 may be connected to the camera 2. Or, the LED light bulb 3 and the camera 2 are two individual products, and the LED light bulb 3 may still be connected to the camera 2.

After the user inputs an LED light bulb controlling command to the terminal 1 or the terminal 1 retrieves a pre-stored LED light bulb controlling command, the first controller 4 of the terminal 1 acquires the LED light bulb controlling command. Further, the first controller 4 may send the LED light bulb controlling command to the LED light bulb 3 connected to the first controller 4 via a wireless sending mode. The LED light bulb 3 may thus perform a light-bulb-adjusting operation corresponding to the LED light bulb controlling command, such as switching on or switching off the LED light bulb 3, adjusting the brightness of the LED light bulb 3, or adjusting the color of the LED light bulb 3, etc.

Because the camera 2 can be configured to be continuous on, the camera 2 may collect the image data within the range monitored by the camera 2. By configuring the LED light bulb 3 within the monitoring range of the camera 2, the camera 2 may collect the image data of the light-bulb-adjusting operation during the process where the LED light bulb 3 performs the light-bulb-adjusting operation corresponding to the LED light bulb controlling command. Further, the camera 2 may send the collected image data of the light-bulb-adjusting operation in a wireless sending mode to the terminal 1 that is connected to the camera 2. Thus, the first controller 4 of the terminal 1 may receive the image data of the light-bulb-adjusting operation.

Further, because the first controller 4 is connected to the display module 5, the first controller 4 may output the received image data of the light-bulb-adjusting operation to the display module 5. The display module 5 may display the received image data of the light-bulb-adjusting operation, such that the user may look up the image data of the light-bulb-adjusting operation. Further, the display module 5 may display the light-adjusting information carried by the LED light bulb controlling command. In such situation, the page displayed by the display module 5 may include an image display region and a light-adjusting information display region. The display module 5 may display the image data of the light-bulb-adjusting operation in the image display region, and display the light-adjusting information in the light-adjusting information display region.

Accordingly, the display module 5 may display the image display region and the light-adjusting information display region, respectively, and display the image display region and the light-adjusting information display region at the same time on a display interface of the display module 5.

In one embodiment, the display module 5 of the terminal 1 displays a light-adjusting information display region, and options to adjust the LED light bulb 3 are displayed within the light-adjusting information display region. The aforementioned options may include a turn-on option, a turn-off option, a brightness-adjustment option, and a color-adjustment option, etc.

The user may choose an option in the light-adjusting information display region. For example, the user may choose the brightness-adjustment option to instruct the LED light bulb 3 to reduce the brightness. Correspondingly, the first controller 4 may receive an LED light bulb controlling command that instructs to lower the brightness of the LED light bulb 3. The first controller 4 may further send such LED light bulb controlling command to the LED light bulb 3 via a wireless sending mode (e.g., Wi-Fi), such that the LED light bulb 3 may reduce the brightness of the LED light bulb 3 based on the LED light bulb controlling command.

During the process where the LED light bulb 3 reduces the brightness of the LED light bulb 3, because the camera 2 monitors the LED light bulb 3 in real-time, the camera 2 may collect the image data showing that the LED light bulb 3 reduces the brightness of the LED light bulb 3. Further, the camera 2 may send the image data collected in real-time showing that the LED light bulb 3 reduces the brightness of the LED light bulb 3 to the terminal 1. After receiving the image data that the LED light bulb 3 lowers the brightness of the LED light bulb, the first controller 4 of the terminal 1 may transmit the image data to the display module 5, and the display module 5 may further display the image data showing that the LED light bulb 3 lowers the brightness of the LED light bulb 3 to the user.

More specifically, when the display module 5 displays the image data, the display module 5 may display the image data reflecting that the LED light bulb 3 lowers the brightness of the LED light bulb 3 in the image display region. Optionally, the image display region may be further enlarged for a better view, and the display region may even occupy the entire screen of the terminal 1, such that the user may clearly check whether the remote operation on the LED light bulb 3 is executed or not.

Figure 2:
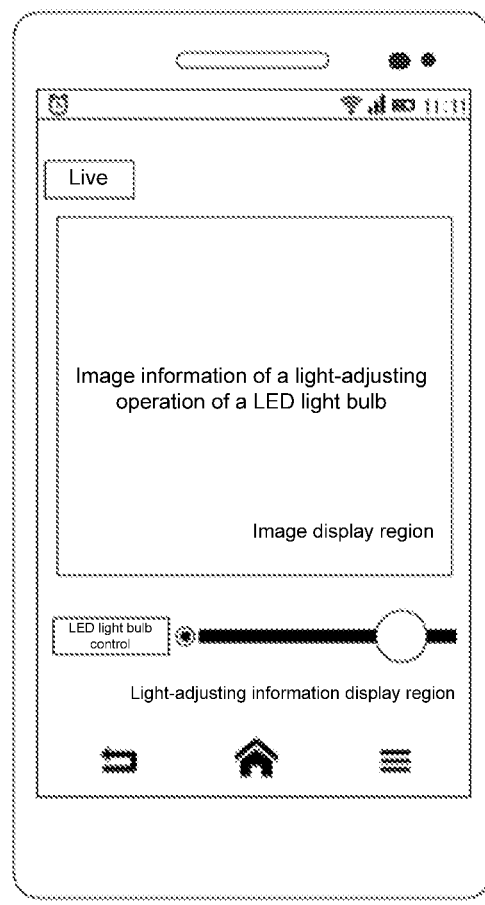
FIG. 2 is a display schematic view of a terminal consistent with embodiments of the present disclosure.

In another embodiment, when the display module 5 displays the aforementioned image data, the light-adjusting information is also displayed. FIG. 2 is a display schematic view of a terminal consistent with embodiments of the present disclosure. As shown in FIG. 2, the display module 5 may display the image data showing the LED light bulb 3 lowering the brightness of the LED light bulb 3 in the image display region, and simultaneously display a light-adjusting information display region. Further, the light-adjusting information display region may be displayed, for example, below the image display region.

Further, in one example, the light-adjusting information display region may include a LED light bulb control for adjusting the light of the LED light bulb 3. Once the LED light bulb control in the light-adjusting information display region is selected by the user via a click or touch or other approaches, a progress bar with a knob may be displayed, and the user may move the knob to the left or the right to select the level of light of the LED light bulb 3. The knob may be, for example, in a round shape, and the present disclosure is not limited thereto.

Because the light-adjusting information display region may include options to be selected by the user, the user may more clearly determine whether a light-adjusting instruction sent by the user corresponds to the current image data or not, and whether a remote operation on the LED light bulb 3 is actually executed.

As such, a terminal 1 including a first controller 4 and a display module 5 is provided, where the first controller 4 is connected to the display module 5, and the first controller 4 is connected to a camera 2 and an LED light bulb 3, respectively. The first controller 4 acquires an LED light bulb controlling command and sends the LED light bulb controlling command to the LED light bulb 3, thus enabling the LED light bulb 3 to perform a light-bulb-adjusting operation corresponding to the LED light bulb controlling command. The first controller 4 further receives image data of a light-bulb-adjusting operation sent by the camera 2 and transmits the image data of the light-bulb-adjusting operation to the display module 5. The image data of the light-bulb-adjusting operation is collected by the camera 2 during a process where the LED light bulb 3 performs the light-bulb-adjusting operation corresponding to the LED light bulb controlling command.

Further, the display module 5 displays the image data of the light-bulb-adjusting operation and the light-adjusting information carried by the LED light bulb controlling command to the user. Accordingly, when the terminal 1 adjusts the light of the LED light bulb 3 remotely, because the camera 2 is configured in the space where the LED light bulb 3 is, the camera 2 may collect the image data of the light-bulb-adjusting operation performed by the LED light bulb 3 corresponding to the LED light bulb controlling command in real-time. Further, the camera 2 may send the image data of the light-bulb-adjusting operation to the terminal 1, such that the terminal 1 may acquire the image data of the light-bulb-adjusting operation of the LED light bulb 3 in real-time. Further, the image data of the light-bulb-adjusting operation of the LED light bulb 3 displayed by the terminal 1 to the user enables the user to determine whether remote operation of the LED light bulb 3 is actually executed.

Figure 3:
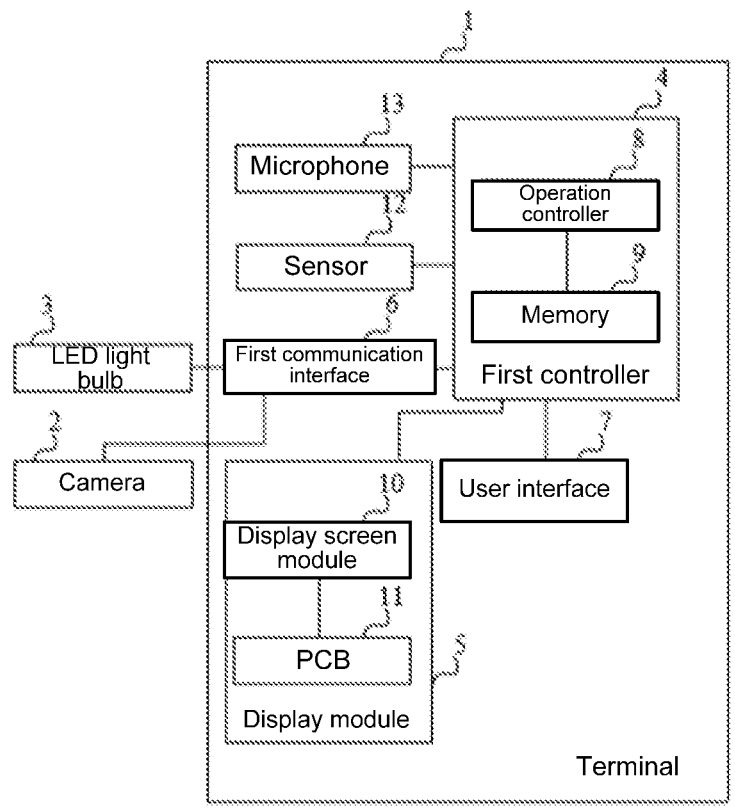
FIG. 3 is a structural schematic view of another terminal consistent with embodiments of the present disclosure.

FIG. 3 is a structural schematic view of another terminal consistent with embodiments of the present disclosure. As shown in FIG. 3, based on FIG. 1, the terminal 1 may further include a first communication interface 6. Optionally, terminal 1 may further include a user interface 7, a microphone 13, or a sensor 12, or any combination thereof.

The first communication interface 6 may be connected to the first controller 4 and further connected to the camera 2 and the LED light bulb 3. The user interface 7 may be connected to the first controller 4, and be configured to receive the LED light bulb controlling command inputted by the user and transmit the LED light bulb controlling command to the LED light bulb 3. The user interface 7 may be an operator, an interface input module, or a keyboard.

The LED light bulb controlling command may include at least one of an on-and-off command of the LED light bulb 3, a brightness-adjustment command of the LED light bulb 3, and a color-adjustment command of the LED light bulb 3. The on-and-off command of the LED light bulb 3 may instruct to turn on or turn off the light at a first preset moment, the brightness-adjustment command of the LED light bulb 3 may instruct to adjust the brightness of the light at a second preset moment, and the color-adjustment command of the LED light bulb 3 may instruct to perform light color adjustment at a third preset moment.

Further, the first controller 4 may include an operation controller 8 and a memory 9, and the memory 9 may be connected to the operation controller 8. The operation controller 8 may be configured to retrieve the LED light bulb controlling command pre-stored in the memory 9, and send the LED light bulb controlling command to the LED light bulb 3 at a moment instructed by the LED light bulb controlling command.

Further, the display module 5 may include a display screen module 10 and a printed circuit board (PCB) 11. The PCB 11 may be connected to the display screen module 10. The display screen module 10 is configured to display the image data of the light-bulb-adjusting operation in a first display interface and display the light-adjusting information carried by the LED light bulb controlling command in a second display interface.

Further, the sensor 12 may be included in the terminal 1 and may be connected to the first controller 4 and may be configured to acquire an action status of the user and send the action status to the first controller 4. The first controller 4 is further configured to, based on a preset first command table, determine the LED light bulb controlling command corresponding to the action status, where the preset first command table includes corresponding relationships between different action statuses and different LED light bulb controlling commands.

Further, the microphone 13 may be included in the terminal 1 and may be connected to the first controller 4. The microphone 13 may be configured to collect audio information of the user and send the audio information to the first controller 4. The first controller 4 may determine the LED light bulb controlling command corresponding to the audio information based on a preset second command table. The preset second command table may include corresponding relationships between different audio information and different LED light bulb controlling commands.

In one embodiment, one first communication interface 6 is disposed in the terminal 1 and the first communication interface 6 may utilize the wireless communication protocol or wired communication protocol in existing technologies. The first controller 4 may be connected to the first communication interface 6, and the first communication interface 6 may be connected to the camera 2 and the LED light bulb 3, respectively.

When the first controller 4 of the terminal 1 performs wired communication with the camera 2 and the LED light bulb 3, the first communication interface 6 is a wired communication interface, and uses the existing wired communication protocol, such as the TCP/IP (Transport Control Protocol/Internet Protocol). When the first controller 4 of the terminal 1 performs wireless communication with the camera 2 and the LED light bulb 3, the first communication interface 6 is a wireless communication interface, and the existing wireless communication protocol such as the WAP (Wireless Application Protocol) is applied.

Further, the display module 5 may include the display screen module 10 and the PCB (printed circuit board) 11, and the PCB 11 is connected to the display screen module 10.

The first controller 4 of the terminal 1 may acquire the LED light bulb controlling command via several approaches. In the first approach, the user interface 7 is configured in the terminal 1, and the user interface 7 may be an operator, an interface input module, or a keyboard. The user interface 7 is connected to the first controller 4, such that when the user inputs the LED light bulb controlling command to the user interface 7, the user interface 7 may receive the LED light bulb controlling command inputted by the user and further transmit the LED light bulb controlling command to the first controller 4 of the terminal 1.

The LED light bulb controlling command may include at least one of an on-and-off command of the LED light bulb 3, a brightness-adjustment command of the LED light bulb 3, and a color-adjustment command of the LED light bulb 3. The on-and-off command of the LED light bulb 3 may instruct to turn on or turn off the light at a first preset moment, the brightness-adjustment command of the LED light bulb 3 may instruct to adjust the brightness of the light at a second preset moment, and the color-adjustment command of the LED light bulb 3 may instruct to perform light color adjustment at a third preset moment.

Accordingly, the first controller 4 of the terminal 1 may send the LED light bulb controlling command to the LED light bulb 3 through the first communication interface 6 at a moment instructed by the LED light bulb controlling command. Further, during the process where the LED light bulb 3 performs the light-bulb-adjusting operation corresponding to the LED light bulb controlling command, the camera 2 may collect the image data of the light-bulb-adjusting operation, and the camera 2 may send the collected image data of the light-bulb-adjusting operation to first controller 4 of the terminal 1. Further, the first controller 4 of the terminal 1 may output the image data of the light-bulb-adjusting operation to the display screen module 10 of the display module 5, and the display screen module 10 may display the image data of the light-bulb-adjusting operation in a first display interface and display the light-adjusting information carried by the LED light bulb controlling command in a second display interface.

For example, the user may input in the user interface 7 that, the light brightness of the LED light bulb 3 is increased at 08:00, and correspondingly, the user interface 7 may generate an LED light bulb controlling command that instructs to increase the light brightness of the LED light bulb 3 at 8:00. Further, the user interface 7 may send the LED light bulb controlling command to the first controller 4. After the first controller 4 receives the LED light bulb controlling command, the first controller 4 may send the LED light bulb controlling command that instructs to increase the light brightness of the LED light bulb 3 at 8:00 to the LED light bulb 3, such that the LED light bulb 3 increases the light brightness of the LED light bulb 3.

Or, the user may inputs the LED light bulb controlling command that turns off the light at the user interface 7. Correspondingly, the user interface 7 may send the LED light bulb controlling command that instructs to turn off the light to the first controller 4, and after receiving the LED light bulb controlling command that instructs to turn off the light, the first controller 4 may send the LED light bulb controlling command that instructs to turn off the light to the LED light bulb 3, such that the LED light bulb 3 may perform an operation of turning off the light.

The second approach for the first controller 4 to acquire the LED light bulb controlling command is as follows. The operation controller 8 and the memory 9 may be configured in the first controller 4, and the memory 9 is connected to the operation controller 8. Different LED light bulb controlling commands may be pre-stored in the memory 9. The operation controller 8 may retrieve a LED light bulb controlling command pre-stored in the memory 9, and the operation controller 8 may send the retrieved LED light bulb controlling command to the LED light bulb 3 at a moment instructed by the LED light bulb controlling command. The LED light bulb controlling command may be an on-and-off command of the LED light bulb 3, a brightness-adjustment command of the LED light bulb 3, or a color-adjustment command of the LED light bulb 3, etc.

Further, during the process where the LED light bulb 3 performs the light-bulb-adjusting operation corresponding to the LED light bulb controlling command, the camera 2 may collect the image data of the light-bulb-adjusting operation, and the camera 2 may send the collected image data of the light-bulb-adjusting operation to first controller 4 of the terminal 1. Further, the first controller 4 of the terminal 1 may output the image data of the light-bulb-adjusting operation to the display screen module 10 of the display module 5, and the display screen module 10 may display the image data of the light-bulb-adjusting operation in a first display interface and display the light-adjusting information carried by the LED light bulb controlling command in a second display interface.

In one example, the user interface 7 may be connected to the memory 9, and the user may pre-store an LED light bulb controlling command that instructs to turn off the LED light bulb 3 at 20:00 on January 3 into the memory 9 via the user interface 7. The memory 9 may store the LED light bulb controlling command that instructs to turn off the LED light bulb 3 at 20:00 on January 3. Further, the first controller 4 may retrieve the LED light bulb controlling command that instructs to turn off the LED light bulb 3 at 8:00 on January 3. When the first controller 4 determines that the current moment is 20:00 on January 3, as instructed by the LED light bulb controlling command, the first controller 4 may send the LED light bulb controlling command that turns off the LED light bulb 3 to the LED light bulb 3, such that the LED light bulb 3 may perform the operation of turning off the light.

The third approach for the first controller 4 to acquire the LED light bulb controlling command is as follows. The sensor 12 is configured in the terminal 1, and the sensor 12 is connected to the first controller 4. The user may perform an action, and the sensor 12 may collect the action status of the user. Further, the sensor 12 may send the action status to the first controller 4.

Optionally, a first command table may be stored in the first controller 4, and the first command table may include corresponding relationships between different action statuses and different LED light bulb controlling commands, such that the first controller 4 may send the LED light bulb controlling command corresponding to a current action status to the LED light bulb 3 through the first communication interface 6.

For example, the user may raise the right hand, and the sensor 12 of the terminal 1 may detect a hand-raising action of the user, and the sensor 12 may send the information of the hand-raising action status of the user to the first controller 4. The first controller 4 may determine that the LED light bulb controlling command corresponding to the information of the hand-raising action status as turning on the light.

The fourth approach for the first controller 4 to acquire the LED light bulb controlling command is as follows. The microphone 13 is configured in the terminal 1, and the microphone 13 is connected to the first controller 4. The user may send out an audio, and the microphone may collect the audio information of the user. Further, the microphone 13 may send the audio information to the first controller 4. Optionally, a second command table may be stored in the first controller 4.

The second command table may include corresponding relationships between different audio information and different LED light bulb controlling commands, such that the first controller 4 may determine the LED light bulb controlling command corresponding to the current audio information. Further, the first controller 4 may send the LED light bulb controlling command corresponding to the current audio information to the LED light bulb 3 through the first communication interface 6.

For example, the user may send out an audio of "please turn on the light", the microphone 13 of the terminal 1 may collect the audio "please turn on the light" and send the audio information to the first controller 4. The first controller 4 may determine that the LED light bulb controlling command corresponding to the audio information is turning on the light.

As such, a terminal 1 including a first controller 4 and a display module 5 is provided, where the first controller 4 is connected to the display module 5 and the first controller 4 is connected to a camera 2 and an LED light bulb 3, respectively; the first controller 4 acquires an LED light bulb controlling command and sends the LED light bulb controlling command to the LED light bulb 3, thus enabling the LED light bulb 3 to perform a light-bulb-adjusting operation corresponding to the LED light bulb controlling command; the first controller 4 further receives image data of a light-bulb-adjusting operation sent by the camera 2 and transmit the image data of the light-bulb-adjusting operation to the display module 5, where the image data of the light-bulb-adjusting operation is collected by the camera 2 during a process where the LED light bulb 3 performs the light-bulb-adjusting operation corresponding to the LED light bulb controlling command.

Further, the display module 5 displays the image data of the light-bulb-adjusting operation and the light-adjusting information carried by the LED light bulb controlling command to the user. Optionally, a user interface 7, an operation controller 8, a sensor 12, or a microphone, or a combination thereof is further provided in the terminal 1.

Accordingly, when the terminal 1 adjusts the light of the LED light bulb 3 remotely, because the camera 2 is configured in the space where the LED light bulb 3 is, the camera 2 may collect the image data of the light-bulb-adjusting operation performed by the LED light bulb 3 corresponding to the LED light bulb controlling command in real-time. Further, the camera 2 may send the image data of the light-bulb-adjusting operation to the terminal 1, such that the terminal 1 may acquire the image data of the light-bulb-adjusting operation of the LED light bulb 3 in real-time. The image data of the light-bulb-adjusting operation of the LED light bulb 3 displayed by the terminal 1 to the user enables the user to determine whether remote operation of the LED light bulb 3 is actually executed.

Figure 4:
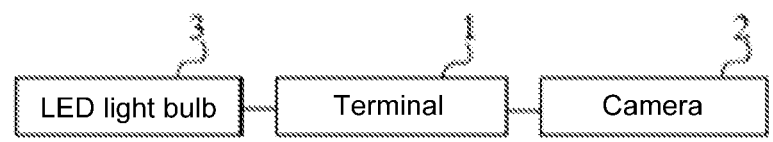
FIG. 4 is a structural schematic view of a system for controlling and displaying an LED light bulb consistent with embodiments of the present disclosure.

FIG. 4 is a structural schematic view of a system for controlling and displaying an LED light bulb consistent with embodiments of the present disclosure. The system includes an LED light bulb 3 and a camera 2, and the LED light bulb 3 is located within the monitoring range of the camera 2. Optionally, the system may further include a terminal 1, and the terminal 1 may be disposed between the camera 2 and the light bulb 3.

The LED light bulb 3 is configured to receive an LED light bulb controlling command sent by the terminal 1 and perform a light-bulb-adjusting operation corresponding to the LED light bulb controlling command. The camera 2 is configured to collect image data of the light-bulb-adjusting operation and send the image data of the light-bulb-adjusting operation to the terminal 1 during the process where the LED light bulb 3 performs the light-bulb-adjusting operation corresponding to the LED light bulb controlling command, such that the terminal 1 is able to display the image data of the light-bulb-adjusting operation and the light-adjusting information carried by the LED light bulb controlling command to the user simultaneously.

More specifically, in the system for controlling and displaying the LED light bulb 3 that includes the LED light bulb 3 and the camera 2, the camera 2 may be placed in the space where the LED light bulb 3 is, that is, the LED light bulb 3 may be located within a monitoring range of the camera 2. The specific number of the LED light bulbs 3 and the locations of LED light bulbs 3, and the number and locations of the cameras 2 may be configured based on actual demands and are not specifically limited.

Further, the LED light bulb 3 and the camera 2 may be integrated into one device, and the LED light bulb 3 may be connected to the camera 2. Or, the LED light bulb 3 and the camera 2 are two individual products, and the LED light bulb 3 may still be connected to the camera 2.

After the user inputs an LED light bulb controlling command to the terminal 1 or the terminal 1 retrieves a pre-stored LED light bulb controlling command, the terminal 1 may acquire the LED light bulb controlling command. Further, the terminal 1 may send the LED light bulb controlling command to the LED light bulb 3 connected to the terminal 1 via a wireless sending mode. Further, the LED light bulb 3 may perform a light-bulb-adjusting operation corresponding to the LED light bulb controlling command, such as switching on or switching off the LED light bulb 3, adjusting the brightness of the LED light bulb 3, or adjusting the color of the LED light bulb 3, etc.

Because the camera 2 can be configured to be continuous on, the camera 2 may collect the image data within the range monitored by the camera 2. By configuring the LED light bulb 3 within the monitoring range of the camera 2, the camera 2 may collect the image data of the light-bulb-adjusting operation during the process where the LED light bulb 3 performs the light-bulb-adjusting operation corresponding to the LED light bulb controlling command. Further, the camera 2 may send the collected image data of the light-bulb-adjusting operation in a wireless sending mode to the terminal 1 connected to the camera 2. Thus, the terminal 1 may receive the image data of the light-bulb-adjusting operation.

Further, the terminal 1 may display the received image data of the light-bulb-adjusting operation, such that the user may look up the image data of the light-bulb-adjusting operation. The terminal 1 may further display the light-adjusting information carried by the LED light bulb controlling command. In such situation, the page displayed by the terminal 1 may include an image display region and a light-adjusting information display region. The terminal 1 may display the image data of the light-bulb-adjusting operation in the image display region, and display the light-adjusting information in the light-adjusting information display region.

Accordingly, the display module 5 may display the image display region and the light-adjusting information display region, respectively, at the same time. Optionally, the display module 5 may display the image display region and the light-adjusting information display region, respectively, at different time.

As such, a system for controlling and displaying the LED light bulb 3 that includes the LED light bulb 3 and the camera 2 is provided. The LED light bulb 3 is within the monitoring range of the camera 2, and the LED light bulb 3 receives an LED light bulb controlling command sent by a terminal 1 and performs a light-bulb-adjusting operation corresponding to the LED light bulb controlling command. The camera 2 collects image data of the light-bulb-adjusting operation and sends the image data of the light-bulb-adjusting operation to the terminal 1 during the process where the LED light bulb 3 performs the light-bulb-adjusting operation corresponding to the LED light bulb controlling command, such that the terminal 1 is able to display the image data of the light-bulb-adjusting operation and the light-adjusting information carried by the LED light bulb controlling command to the user simultaneously.

Accordingly, when the terminal 1 adjusts the light of the LED light bulb 3 remotely, because the camera 2 is configured in the space where the LED light bulb 3 is, the camera 2 may collect the image data of the light-bulb-adjusting operation performed by the LED light bulb 3 corresponding to the LED light bulb controlling command in real-time. Further, the camera 2 may send the image data of the light-bulb-adjusting operation to the terminal 1, such that the terminal 1 may acquire the image data of the light-bulb-adjusting operation of the LED light bulb 3 in real-time. Further, the image data of the light-bulb-adjusting operation of the LED light bulb 3 may be displayed by the terminal 1 to the user, thus enabling the user to determine whether the remote operation of the LED light bulb 3 is actually executed.

Figure 5:
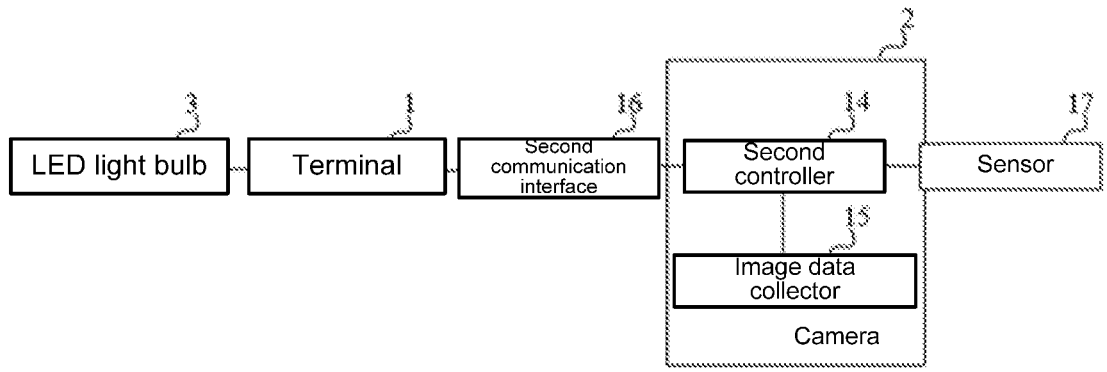
FIG. 5 is a structural schematic view of another system for controlling and displaying an LED light bulb consistent with embodiments of the present disclosure.

FIG. 5 is a structural schematic view of another system for controlling and displaying an LED light bulb consistent with embodiments of the present disclosure. Based on FIG. 4, as shown in FIG. 5, the disclosed system may include the terminal 1, the camera 2, and the LED light bulb 3, as illustrated the foregoing descriptions. Optionally, the system may further include a second communication interface 16, or a sensor 17, or a combination thereof.

The camera 2 may further include a second controller 14 and an image data collector 15. The second controller 14 may be connected to the image data collector 15, and the second controller 14 may be connected to the terminal 1. Optionally, the second controller 14 may be connected to the terminal 1 via the second communication interface 16.

The image data collector 15 may be configured to collect the image data of the light-bulb-adjusting operation during the process where the LED light bulb 3 performs the light-bulb-adjusting operation corresponding to the LED light bulb controlling command, and send the collected image data of the light-bulb-adjusting operation to the second controller 14. The second controller 14 may be configured to send the image data of the light-bulb-adjusting operation to the terminal 1, such that the terminal 1 is able to display the image data of the light-bulb-adjusting operation and the light-adjusting information carried by the LED light bulb controlling command to the user.

In one example, when the second communication interface 16 is included in the disclosed system, the second controller 14 may be connected to the second communication interface 16, and the second communication interface 16 may be connected to the terminal 1. The second controller 14 is specifically configured to send the collected image data of the light-bulb-adjusting operation to the terminal 1 through the second communication interface 16 every a preset period of time. Or, the second controller is configured to receive an image-acquiring command sent by the terminal 1 and send the collected image data of the light-bulb-adjusting operation to the terminal 1 based on the image-acquiring command through the second communication interface 16.

In another example, the sensor 17 may be included in the disclosed system, and optionally, the sensor 17 may be disposed in the camera 2. The sensor 17 may be connected to the second controller 14. The sensor 17 may be configured to sense a change in the light of the LED light bulb 3 to generate a light sensing signal and transmit the light sensing signal to the second controller 14.

The second controller 14 may be specifically configured to receive the light sensing signal and based on the light sensing signal, send the collected image data of the light-bulb-adjusting operation to the terminal 1. Optionally, the camera 2 is integrated into the light bulb 3.

As described previously, the system for controlling and displaying the LED light bulb 3 that includes the LED light bulb 3 and the camera 2 may further include the aforementioned terminal 1. Further, the camera 2 may be integrated into the light bulb 3, such that the camera 2 and the light bulb 3 are integrated into the same product. The terminal 1 may be connected to the camera 2 and the LED light bulb 3 remotely and respectively. The structure and principles of the terminal 1 may be similar to that in the aforementioned descriptions, and repeated illustrations are thus not provided.

After the user inputs an LED light bulb controlling command to the terminal 1 or the terminal 1 retrieves the pre-stored LED light bulb controlling command, the terminal 1 acquires the LED light bulb controlling command. Further, the terminal 1 may send the LED light bulb controlling command to the LED light bulb 3 connected to the terminal 1 via a wireless sending mode. Further, the LED light bulb 3 may perform a light-bulb-adjusting operation corresponding to the LED light bulb controlling command, such as switching on or switching off the LED light bulb 3, adjusting the brightness of the LED light bulb 3, or adjusting the color of the LED light bulb 3, etc.

Because the camera 2 can be configured to be continuous on, the camera 2 may collect the image data within the range monitored by the camera 2. Further, because the LED light bulb 3 is within the monitoring range of the camera 2, the camera 2 may collect the image data of the light-bulb-adjusting operation during the process where the LED light bulb 3 performs the light-bulb-adjusting operation corresponding to the LED light bulb controlling command. Further, the camera 2 may send the collected image data of the light-bulb-adjusting operation to the terminal 1 that is connected to the camera 2.

Thus, the terminal 1 may receive the image data of the light-bulb-adjusting operation, and the terminal 1 may display the first display interface where the image data of the light-bulb-adjusting operation is and the second display interface where the light-adjusting information carried by the LED light bulb controlling command is.

Further, several approaches may exist for the camera 2 to send the collected image data of the light-bulb-adjusting operation to the terminal 1. The first approach for the camera 2 to send the collected image data of the light-bulb-adjusting operation to the terminal 1 is as follows. The camera 2 includes the second controller 14 and the image data collector 15, the second controller 14 is connected to the image data collector 15, and the second controller 14 is connected to the terminal 1. The image data collector 15 may collect the image data of the light-bulb-adjusting operation in real-time during the process where the LED light bulb 3 performs a light-bulb-adjusting operation corresponding to the LED light bulb controlling command, and transmit the image data of the light-bulb-adjusting operation to the second controller 14.

Thus, the second controller 14 may send the image data of the light-bulb-adjusting operation to the terminal 1. The terminal 1 may further display the first display interface where the image data of the light-bulb-adjusting operation is in and the second display interface where the light-adjusting information carried by the LED light bulb controlling command is in to a user.

The second approach for the camera 2 to send the collected image data of the light-bulb-adjusting operation to the terminal 1 is as follows. A second communication interface 16 is configured in the camera 2, and the second controller 14 is connected to the second communication interface 16. The second communication interface 16 may utilize the wireless communication protocol or wired communication protocol in existing technologies to connect the second communication interface 16 to the terminal 1. When the camera 2 performs wired communication with the terminal 1, the second communication interface 16 is a wired communication interface, and the existing wired communication protocol such as TCP/IP protocol is applied. When the camera 2 performs wireless communication with the terminal 1, the second communication interface 16 is a wireless communication interface, and the existing wireless communication protocol such as WAP protocol is applied.

Under such situations, the second controller 14 may send the collected image data of the light-bulb-adjusting operation to the terminal 1 through the second communication interface 16 every a preset period of time, or the second controller 14 may, after receiving an image-acquiring command sent by the terminal 1, send the collected image data of the light-bulb-adjusting operation to the terminal 1 based on the image-acquiring command through the second communication interface 16.

For example, the second controller 14 may send the collected image data of the light-bulb-adjusting operation to the terminal 1 through the second communication interface 16 every 1 hour.

The third approach for the camera 2 to send the collected image data of the light-bulb-adjusting operation to the terminal 1 is as follows. The sensor 17 may be configured in the camera 2, and the sensor 17 may be connected to the second controller 14. When the LED light bulb 3 performs a light-bulb-adjusting operation based on the LED light bulb controlling demand, the sensor 17 may sense a change in the light of the LED light bulb 3, and generate a light sensing signal. The sensor 17 may further transmit the light sensing signal to the second controller 14. After receiving the light sensing signal, the second controller 14 may, based on the light sensing signal, send the collected image data of the light-bulb-adjusting operation to the terminal 1.

For example, the sensor 17 may sense that the light of the LED light bulb 3 becomes brighter and thus generate a light sensing signal. The sensor 17 may transmit the light sensing signal to the second controller 14, such that the second controller 14 may send the collected image data of the light-bulb-adjusting operation to the terminal 1.

As such, a system for controlling and displaying the LED light bulb 3 that includes the LED light bulb 3, the camera 2, and the terminal 1 is provided. The LED light bulb 3 is within the monitoring range of the camera 2, and the LED light bulb 3 receives an LED light bulb controlling command sent by a terminal 1 and performs a light-bulb-adjusting operation corresponding to the LED light bulb controlling command. The camera 2 collects image data of the light-bulb-adjusting operation and sends the image data of the light-bulb-adjusting operation to the terminal 1 during the process where the LED light bulb 3 performs the light-bulb-adjusting operation corresponding to the LED light bulb controlling command, such that the terminal 1 is able to display the image data of the light-bulb-adjusting operation and the light-adjusting information carried by the LED light bulb controlling command to the user simultaneously.

Further, the camera 2 may be integrated into the light bulb 3, and the second controller 14, the second communication interface 16, or the sensor 17, etc., may be disposed in the camera 2 to send the image data of the light-adjusting operation to the terminal 1 through different approaches. Thus, when the terminal 1 adjusts the light of the LED light bulb 3 remotely, because the camera 2 is configured in the space where the LED light bulb 3 is, the camera 2 may collect the image data of the light-bulb-adjusting operation performed by the LED light bulb 3 corresponding to the LED light bulb controlling command in real-time.

Further, the camera 2 may send the image data of the light-bulb-adjusting operation to the terminal 1, such that the terminal 1 may acquire the image data of the light-bulb-adjusting operation of the LED light bulb 3 in real-time. Further, the image data of the light-bulb-adjusting operation of the LED light bulb 3 may be displayed by the terminal 1 to the user, thus enabling the user to determine whether the remote operation of the LED light bulb 3 is actually executed.

Figure 6:
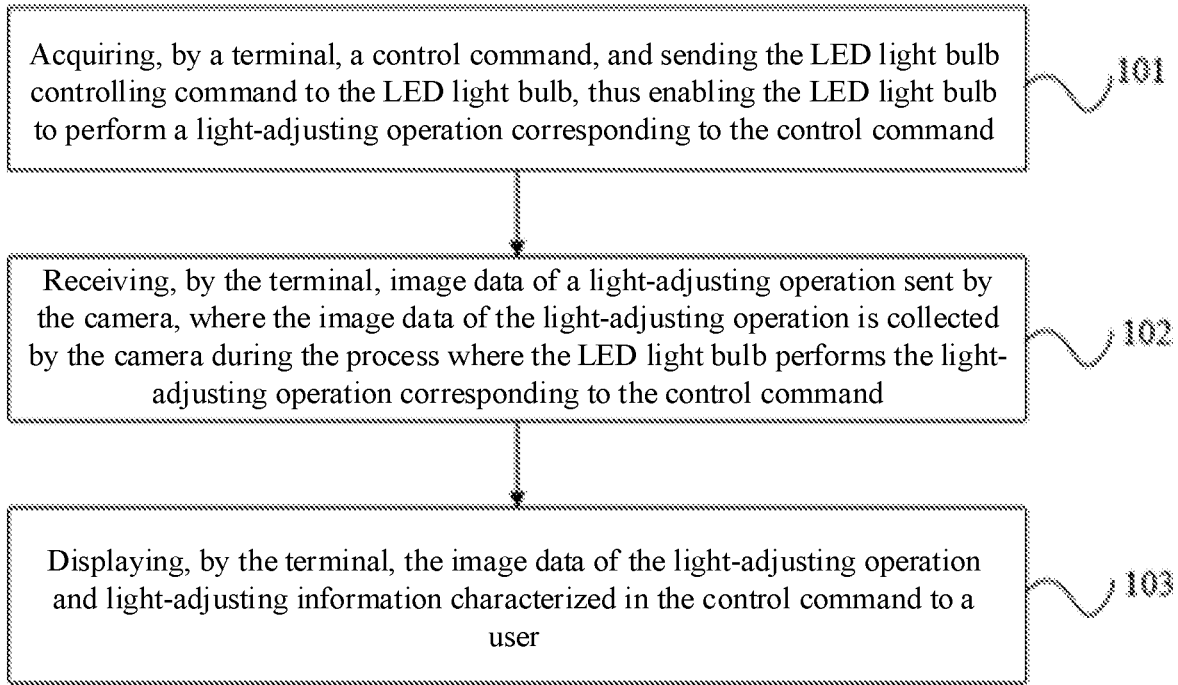
FIG. 6 is a flow chart of a method for controlling and displaying an LED light bulb consistent with embodiments of the present disclosure.

FIG. 6 is a flow chart illustrating a method for controlling and displaying an LED light bulb consistent with embodiments of the present disclosure. As shown in FIG. 6, the method may include: acquiring, by a terminal, an LED light bulb controlling command, and sending the LED light bulb controlling command to the LED light bulb, thereby enabling the LED light bulb to perform a light-bulb-adjusting operation corresponding to the LED light bulb controlling command (Step 101).

More specifically, a terminal, a camera, and an LED light bulb are provided, and the terminal is connected to the camera and the LED light bulb, respectively. The camera may be placed in the space where the LED light bulb is, such that the LED light bulb may be located within a monitoring range of the camera. The specific number of the LED light bulbs and the locations of LED light bulbs, and the number and locations of the cameras may be configured based on actual demands and are not specifically limited.

Further, the LED light bulb and the camera may be integrated into one device, and the LED light bulb may be connected to the camera. Or, the LED light bulb and the camera may be two individual products, as long as the LED light bulb is still connected to the camera.

After the user inputs an LED light bulb controlling command to the terminal or the terminal retrieves the pre-stored LED light bulb controlling command, the terminal may acquire the LED light bulb controlling command. The terminal may further send the LED light bulb controlling command to the LED light bulb connected to the terminal via a wireless sending mode. Further, the LED light bulb may perform a light-bulb-adjusting operation corresponding to the LED light bulb controlling command, such as switching on or switching off the LED light bulb, adjusting the brightness of the LED light bulb, or adjusting the color of the LED light bulb, etc.

In Step 102, the terminal receives image data of a light-bulb-adjusting operation sent by the camera, where the image data of the light-bulb-adjusting operation is collected by the camera during the process where the LED light bulb performs the light-bulb-adjusting operation corresponding to the LED light bulb controlling command.

More specifically, because the camera is configured to be continuous on, the camera may collect the image data within the range monitored by the camera. Because the LED light bulb is within the monitoring range of the camera, the camera may collect the image data of the light-bulb-adjusting operation during the process where the LED light bulb performs the light-bulb-adjusting operation corresponding to the LED light bulb controlling command. Further, the camera may send the collected image data of the light-bulb-adjusting operation in a wireless sending mode to the terminal connected to the camera. Under such situation, the first controller of the terminal may receive the image data of the light-bulb-adjusting operation.

In Step 103, the terminal displays the image data of the light-bulb-adjusting operation and light-adjusting information carried by the LED light bulb controlling command to a user.

More specifically, the terminal may display the received image data of the light-bulb-adjusting operation, and the user may look up the image data of the light-bulb-adjusting operation. The terminal may further display the light-adjusting information carried by the LED light bulb controlling command. Accordingly, the page displayed by the terminal may include an image display region and a light-adjusting information display region. The terminal may display the image data of the light-bulb-adjusting operation in the image display region, and display the light-adjusting information in the light-adjusting information display region. That is, the terminal may display the image display region and the light-adjusting information display region, respectively, or display the image display region and the light-adjusting information display region at the same time.

Descriptions of the above method may also refer to the system for controlling and displaying the terminal and the LED light bulb illustrated in the aforementioned descriptions.

As such, by using a terminal to acquire an LED light bulb controlling command and send an LED light bulb controlling command to the LED light bulb, the present disclosure enables the LED light bulb to perform a light-bulb-adjusting operation corresponding to the LED light bulb controlling command. The terminal may receive image data of the light-bulb-adjusting operation sent by the camera, where the image data of the light-bulb-adjusting operation is collected by the camera during the process where the LED light bulb performs the light-bulb-adjusting operation corresponding to the LED light bulb controlling command. Further, the terminal may display the image data of the light-bulb-adjusting operation and light-adjusting information carried by the LED light bulb controlling command to a user.

Accordingly, when the terminal adjusts the light of the LED light bulb remotely, because the camera is configured in the space where the LED light bulb is, the camera may collect the image data of the light-bulb-adjusting operation performed by the LED light bulb corresponding to the LED light bulb controlling command in real-time.

Further, the camera may send the image data of the light-bulb-adjusting operation to the terminal, such that the terminal may acquire the image data of the light-bulb-adjusting operation of the LED light bulb in real-time. Further, the image data of the light-bulb-adjusting operation of the LED light bulb may be displayed by the terminal to the user, thereby enabling the user to determine whether a remote operation of the LED light bulb is actually executed.

Figure 7:
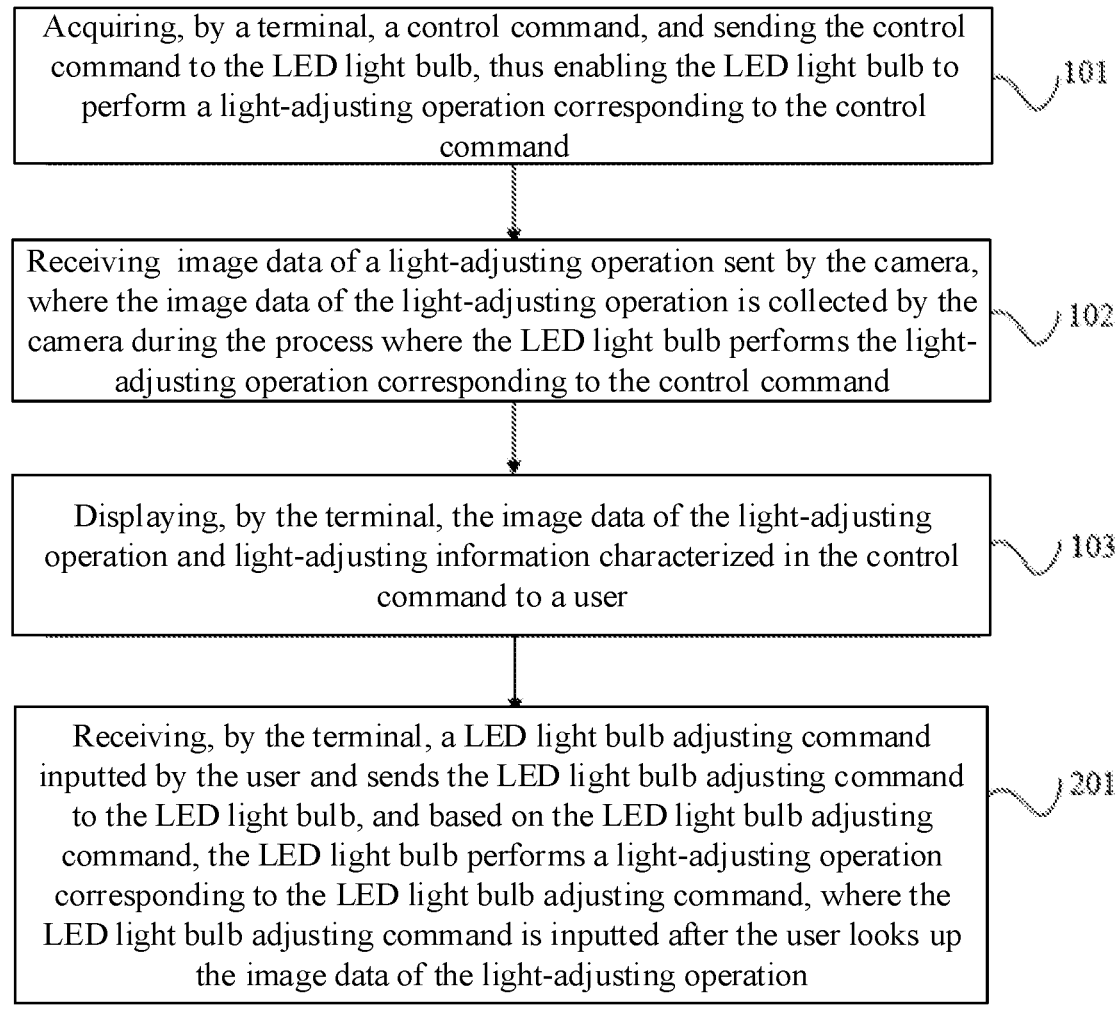
FIG. 7 is a flow chart of another method for controlling and displaying an LED light bulb consistent with embodiments of the present disclosure.

FIG. 7 is a flow chart of another method for controlling and displaying an LED light bulb consistent with embodiments of the present disclosure. Based on FIG. 6, as shown in FIG. 7, the disclosed method includes Step 101 that may be implemented through a plurality of approaches.

In a first approach of implementing Step 101, a terminal receives an LED light bulb controlling command inputted by a user, or retrieves a pre-stored LED light bulb controlling command. Further, the terminal sends the LED light bulb controlling command to the LED light bulb at a moment instructed by the LED light bulb controlling command. The LED light bulb controlling command may include at least one of an on-and-off command of the LED light bulb, a brightness-adjustment command of the LED light bulb, and a color-adjustment command of the LED light bulb.

The on-and-off command of the LED light bulb may instruct to turn on or turn off the light at a first preset moment, the brightness-adjustment command of the LED light bulb may instruct to adjust the brightness of the light at a second preset moment, and the color-adjustment command of the LED light bulb may instruct to perform light color adjustment at a third preset moment.

In a second approach, the terminal acquires an action status of a user, and based on a preset first command table, the terminal determines the LED light bulb controlling command corresponding to the action status. The preset first command table includes corresponding relationships between different action statuses and different LED light bulb controlling commands.

In a third approach: the terminal collects audio information of a user, and based on a preset second command table, the terminal determines the LED light bulb controlling command corresponding to the audio information, where the preset second command table may include corresponding relationships between different audio information and different LED light bulb controlling commands. The terminal may further send the LED light bulb controlling command to the LED light bulb.

Similarly, the method may include Step 102, and Step 102 may be implemented through a plurality of approaches. In a first approach of implementing Step 102, the camera may send the collected image data of the light-bulb-adjusting operation to the terminal every preset period of time, or the terminal sends an image-acquiring command to the camera, and sends the collected image data of the light-bulb-adjusting operation to the terminal based on the image-acquiring command after receiving the image-acquiring command sent by the terminal.

In a second approach of implementing Step 102: the camera senses a change in the light of the LED light bulb, and generates a light sensing signal; based on the light sensing signal, the camera sends the collected image data of the light-bulb-adjusting operation to the terminal.

The method further includes Step 103, and in Step 103, the terminal displays the first display interface where the image data of the light-bulb-adjusting operation is and the second display interface where the light-adjusting information carried by the LED light bulb controlling command is.

After Step 103, the method further includes Step 201. In Step 201, the terminal receives an LED light bulb adjusting command inputted by the user and sends the LED light bulb adjusting command to the LED light bulb, where the LED light bulb adjusting command is inputted after the user looks up the image data of the light-bulb-adjusting operation; and based on the LED light bulb adjusting command, the LED light bulb performs a light-bulb-adjusting operation corresponding to the LED light bulb adjusting command.

More specifically, the method provided by the present disclosure may refer to the system for controlling and displaying LED light bulb illustrated in the aforementioned descriptions, and repeated illustrations are not provided herein.

As such, by using a terminal to acquire an LED light bulb controlling command and send an LED light bulb controlling command to the LED light bulb, the present disclosure enables the LED light bulb to perform a light-bulb-adjusting operation corresponding to the LED light bulb controlling command. The terminal may receive image data of the light-bulb-adjusting operation sent by the camera, where the image data of the light-bulb-adjusting operation is collected by the camera during the process where the LED light bulb performs the light-bulb-adjusting operation corresponding to the LED light bulb controlling command. The terminal may display the image data of the light-bulb-adjusting operation and light-adjusting information carried by the LED light bulb controlling command to a user.

Further, the terminal receives an LED light bulb adjusting command inputted by the user and sends the LED light bulb adjusting command to the LED light bulb, where the LED light bulb adjusting command is inputted after the user looks up the image data of the light-bulb-adjusting operation. Based on the LED light bulb adjusting command, the LED light bulb performs a light-bulb-adjusting operation corresponding to the LED light bulb adjusting command.

Accordingly, when the terminal adjusts the light of the LED light bulb remotely, because the camera is configured in the space where the LED light bulb is, the camera may collect the image data of the light-bulb-adjusting operation performed by the LED light bulb corresponding to the LED light bulb controlling command in real-time. Further, the camera may send the image data of the light-bulb-adjusting operation to the terminal, such that the terminal may acquire the image data of the light-bulb-adjusting operation of the LED light bulb in real-time. Further, the image data of the light-bulb-adjusting operation of the LED light bulb may be displayed by the terminal to the user, thereby enabling the user to determine whether a remote operation of the LED light bulb is actually executed.

Those ordinarily skilled in the relevant art may understand that all or partial steps in the aforementioned embodiments may be implemented through hardware related to program instructions. The aforementioned program may be stored in a computer-readable storage medium. When the program is executed, steps included in each aforementioned embodiment may be executed. The aforementioned storage medium may be any medium for storing program codes, such as ROM, RAM, magnetic disc, or optical disc.

Lastly, it should be illustrated that: the aforementioned embodiments are only used to illustrate technical solutions of the present disclosure, but not intended to be limiting of the present disclosure. Though the present disclosure is illustrated in detail with reference to the aforementioned embodiments, those ordinarily skilled in the relevant art shall understand that technical solutions recorded in each aforementioned embodiment may be modified, or part of the technical characteristics may be equally replaced. Such modification or replacement shall not depart the nature of the technical solutions from the spirit and scope of the technical solutions in each embodiment of the present disclosure.

What is claimed is:

1. A terminal, comprising:
a first controller; and
a display module,
wherein the first controller is connected to the display module, and the first controller is connected to a camera and an LED light bulb,
the first controller is configured to acquire a control command and send the control command to the LED light bulb, thereby enabling the LED light bulb to perform a light-bulb-adjusting operation corresponding to the control command,
the first controller is further configured to receive image data of the light-bulb-adjusting operation sent by the camera and transmit the image data of the light-bulb-adjusting operation to the display module, wherein image data of the light-bulb-adjusting operation is collected by the camera during a process where the LED light bulb performs the light-bulb-adjusting operation corresponding to the control command, and
the display module is configured to display the image data of the light-bulb-adjusting operation and light-adjusting information carried by the control command to a user.

2. The terminal according to claim 1, wherein:
the terminal further includes a first communication interface,
the first controller is connected to the first communication interface, and
the first communication interface is connected to the camera and the LED light bulb, respectively.

3. The terminal according to claim 1, wherein:
the terminal further includes a user interface,
the user interface is connected to the first controller,
the user interface is configured to receive the control command inputted by the user and transmit the control command to the LED light bulb,
the first controller is specifically configured to send the control command to the LED light bulb 3 at a moment instructed by the control command,
the control command includes at least one of an on-and-off command of the LED light bulb, a brightness-adjustment command of the LED light bulb, and a color-adjustment command of the LED light bulb, and
the on-and-off command of the LED light bulb instructs to turn on or turn off the light at a first preset moment, the brightness-adjustment command of the LED light bulb instructs to adjust the brightness of the light at a second preset moment, and the color-adjustment command of the LED light bulb instructs to perform light color adjustment at a third preset moment.

4. The terminal according to claim 3, wherein:
the first controller further includes an operation controller and a memory,
the memory is connected to the operation controller,
the operation controller is configured to retrieve a control command pre-stored in the memory, and
the operation controller is further configured to send the retrieved control command to the LED light bulb at a moment instructed by the control command.

5. The terminal according to claim 3, wherein:
the user interface includes an operator, an interface input module, or a keyboard.

6. The terminal according to claim 1, wherein:
the display module further includes a display screen module and a PCB,
the PCB is connected to the display screen module, and
the display screen module is configured to display the image data of the light-bulb-adjusting operation in a first display interface and display the light-adjusting information carried by the control command in a second display interface.

7. The terminal according to claim 1, wherein:
the terminal further includes a sensor,
the sensor is connected to the first controller,
the sensor is configured to acquire an action status of the user and send the action status to the first controller, and
the first controller is further configured to, based on a preset first command table, determine a control command corresponding to the action status, wherein the first command table includes corresponding relationships between different action statuses and different control commands.

8. The terminal according to claim 1, wherein:
the terminal further includes a microphone,
the microphone is connected to the first controller,
the microphone is configured to collect audio information of the user and send the audio information to the first controller, and
the first controller is further configured to, based on a preset second command table, determine a control command corresponding to the audio information, wherein the second command table includes corresponding relationships between different audio information and different control commands.

9. A system for controlling and displaying an LED light bulb, comprising:
the LED light bulb, and
a camera,
wherein the LED light bulb is located within a monitoring range of the camera,
the LED light bulb is configured to receive a control command sent by a terminal and perform a light-bulb-adjusting operation corresponding to the control command, and
the camera is configured to collect image data of the light-bulb-adjusting operation and send the image data of the light-bulb-adjusting operation to the terminal during a process where the LED light bulb performs the light-bulb-adjusting operation corresponding to the control command, such that the terminal is able to display the image data of the light-bulb-adjusting operation and light-adjusting information carried by the control command to a user.

10. The system according to claim 9, wherein
the camera includes a second controller and an image data collector,
the second controller is connected to the image data collector and the terminal,
the image data collector is configured to collect the image data of the light-bulb-adjusting operation during the process where the LED light bulb performs the light-bulb-adjusting operation corresponding to the control command, and send the collected image data of the light-bulb-adjusting operation to the second controller, and the second controller is configured to send the image data of the light-bulb-adjusting operation to the terminal, thereby enabling the terminal to display the first display interface where the image data of the light-bulb-adjusting operation is in and the second display interface where the light-adjusting information carried by the control command is in to the user.

11. The system according to claim 10, wherein:
the camera further includes a second communication interface,
second controller is connected to the second communication interface,
the second communication interface is connected to the terminal, and
the second controller is specifically configured to send the collected image data of the light-bulb-adjusting operation to the terminal through the second communication interface every a preset period of time, or is specifically configured to receive an image-acquiring command sent by the terminal and send the collected image data of the light-bulb-adjusting operation to the terminal based on the image-acquiring command through the second communication interface.

12. The system according to claim 10, wherein:
the camera further includes a sensor,
the sensor is connected to the second controller,
the sensor is configured to sense a change in light of the LED light bulb, generate a light sensing signal, and transmit the light sensing signal to the second controller, and
the second controller is specifically configured to receive the light sensing signal and, based on the light sensing signal, send the collected image data of the light-bulb-adjusting operation to the terminal.

13. The system according to claim 9, wherein:
the camera is integrated into the LED light bulb.

14. The system according to claim 9, further including:
the terminal,
wherein the terminal includes the first controller and the display module,
the first controller is connected to the display module, and the first controller is further connected to the camera and the LED light bulb, respectively,
the first controller is configured to acquire the control command and send the control command to the LED light bulb, thereby enabling the LED light bulb to perform the light-bulb-adjusting operation corresponding to the control command,
the first controller is further configured to receive image data of the light-bulb-adjusting operation sent by the camera and transmit the image data of the light-bulb-adjusting operation to the display module, wherein image data of the light-bulb-adjusting operation is collected by the camera during the process where the LED light bulb performs the light-bulb-adjusting operation corresponding to the control command, and
the display module is configured to display the image data of the light-bulb-adjusting operation and the light-adjusting information carried by the control command to the user.

15. A method for controlling and displaying an LED light bulb, comprising:
acquiring, by a terminal, a control command, and sending the control command to the LED light bulb, thereby enabling the LED light bulb to perform a light-bulb-adjusting operation corresponding to the control command;
receiving, by the terminal, image data of the light-bulb-adjusting operation sent by a camera, wherein the image data of the light-bulb-adjusting operation is collected by the camera during a process where the LED light bulb performs the light-bulb-adjusting operation corresponding to the control command; and
displaying, by the terminal, the image data of the light-bulb-adjusting operation and light-adjusting information carried by the control command to a user.

16. The method according to claim 15, wherein:
acquiring, by the terminal, the control command, and sending the control command to the LED light bulb further includes:
receiving, by the terminal, the control command inputted by the user, or retrieving, by the terminal, a pre-stored control command; and
sending, by the terminal, the control command to the LED light bulb at a moment instructed by the control command,
wherein the control command includes at least one of an on-and-off command of the LED light bulb, a brightness-adjustment command of the LED light bulb, and a color-adjustment command of the LED light bulb, and
the on-and-off command of the LED light bulb instructs to turn on or turn off the light at a first preset moment, the brightness-adjustment command of the LED light bulb instructs to adjust the brightness of the light at a second preset moment, and the color-adjustment command of the LED light bulb instructs to perform light color adjustment at a third preset moment.

17. The method according to claim 15, wherein acquiring, by terminal, the control command further includes:
acquiring, by the terminal, an action status of a user; and
determining, by the terminal, a control command corresponding to the action status based on a preset first command table, wherein the first command table includes corresponding relationships between different action statuses and different control commands.

18. The method according to claim 15, wherein acquiring, by terminal, the control command further includes:
acquiring, by the terminal, audio information; and
determining, by the terminal, a control command corresponding to the audio information based on a preset second command table, wherein the second command table includes corresponding relationships between different audio information and different control commands.

19. The method according to claim 15, wherein receiving, by the terminal, the image data of the light-bulb-adjusting operation sent by the camera further includes:
sending, by the camera, every a preset period of time, the collected image data of the light-bulb-adjusting operation to the terminal; or
sending, by the terminal, an image-acquiring command to the camera, such that after receiving an image-acquiring command sent by the terminal, the camera sends the collected image data of the light-bulb-adjusting operation to the terminal based on the image-acquiring command.

20. The method according to claim 15, wherein receiving, by the terminal, the image data of the light-bulb-adjusting operation sent by the camera further includes:
sensing, by the camera, a change in light of the LED light bulb, and generating, by the camera, a light sensing signal; and sending, by the camera, the collected image data of the light-bulb-adjusting operation to the terminal based on the light sensing signal.

\* \* \* \* \*